US 6,652,150 B2

(12) United States Patent
Buchheim et al.

(10) Patent No.: US 6,652,150 B2
(45) Date of Patent: *Nov. 25, 2003

(54) BEARING ARRANGEMENT AND METHOD FOR FIXING AT LEAST ONE BEARING IN PLACE IN A BEARING RETAINER

(75) Inventors: Burkhard Buchheim, Schweinfurt (DE); Berthold Beyfuss, Kaisten (DE); Helmut Hauck, Euerbach (DE); Peter Horling, Mainberg (DE)

(73) Assignee: SKF GmbH, Schweinfurt (DE)

( * ) Notice: Subject to any disclaimer, the term of this patent is extended or adjusted under 35 U.S.C. 154(b) by 37 days.

This patent is subject to a terminal disclaimer.

(21) Appl. No.: 09/783,991

(22) Filed: Feb. 16, 2001

(65) Prior Publication Data
US 2001/0022871 A1 Sep. 20, 2001

(30) Foreign Application Priority Data
Feb. 18, 2000 (DE) .......................... 100 07 437

(51) Int. Cl.⁷ ............................. F16C 35/04
(52) U.S. Cl. .............. 384/537; 384/903; 29/898.07
(58) Field of Search ............... 384/537, 903, 384/41, 559, 428, 561, 617, 510, 563, 615, 504, 517, 489, 208, 209, 191.3, 546, 495, 210, 585, 538, 536, 539, 584; 29/898.07, 505, 513

(56) References Cited
U.S. PATENT DOCUMENTS

| | | | | |
|---|---|---|---|---|
| 1,810,093 A | * | 6/1931 | Timson | |
| 2,427,072 A | * | 9/1947 | Rubin | |
| 2,457,472 A | * | 12/1948 | Hufferd et al. | |
| 2,473,267 A | * | 6/1949 | Wightman | |
| 3,169,040 A | * | 2/1965 | Ryan | |
| 3,888,597 A | * | 6/1975 | Datta | |
| 4,017,128 A | * | 4/1977 | Setele et al. | |
| 4,125,298 A | * | 11/1978 | Heurich et al. | |

(List continued on next page.)

FOREIGN PATENT DOCUMENTS

| | | | |
|---|---|---|---|
| DE | 29802228 | * | 5/1998 |
| DE | 198 05 237 | | 8/1999 |
| DE | 19935469 | * | 5/2000 |
| DE | 19919201 | * | 6/2000 |
| DE | 010007437 A1 | * | 8/2001 |
| EP | 147372 | * | 7/1985 |
| EP | 485001 | * | 5/1992 |
| FR | 2805319 | * | 8/2001 |
| GB | 1376534 | * | 12/1974 |
| GB | 1458047 | * | 12/1976 |
| GB | 1497151 | * | 1/1978 |
| GB | 2088488 | * | 6/1982 |
| GB | 2359346 | * | 8/2001 |

Primary Examiner—Douglas C. Butler
(74) Attorney, Agent, or Firm—Burns, Doane, Swecker & Mathis, LLP

(57) ABSTRACT

A method for fixing at least one bearing in place in a bearing retainer involves positioning the bearing in the depression, providing an elastic element which acts in the axial direction on the bearing either before or after the bearing is positioned in the depression so that the elastic element is supported on the bearing in a first axial direction, and deforming a partial area of the bearing retainer so that the deformed partial area of the bearing retainer supports the elastic element in a second axial direction which extends opposite the first axial direction. A bearing arrangement produced according to the present invention includes a bearing retainer having at least one depression in which is positioned a bearing, with a portion of the bearing retainer overlapping a portion of the bearing to form an interlocking connection between the bearing retainer and the bearing in an axial direction. An elastic element is arranged in an area of the overlap of the bearing and the bearing retainer, and is supported on the bearing in a first axial direction while being supported on the bearing retainer in a second axial direction opposite to the first axial direction.

9 Claims, 3 Drawing Sheets

U.S. PATENT DOCUMENTS

| | | | |
|---|---|---|---|
| 4,253,711 A | * | 3/1981 | Lynn et al. |
| 4,443,044 A | * | 4/1984 | Cain et al. |
| 4,565,458 A | * | 1/1986 | Achee et al. ............... 384/561 |
| 4,569,602 A | * | 2/1986 | Lundgren .................. 384/517 |
| 4,640,632 A | * | 2/1987 | Brandenstein et al. ...... 384/537 |
| 4,688,952 A | * | 8/1987 | Setele ....................... 384/537 |
| 4,718,781 A | * | 1/1988 | Gerard ...................... 384/537 |
| 4,888,862 A | * | 12/1989 | Brandenstein et al. |
| 5,125,755 A | * | 6/1992 | Adler et al. ................ 384/536 |
| 5,462,369 A | * | 10/1995 | Layne et al. |
| 5,598,747 A | * | 2/1997 | Schetter et al. |
| 5,863,137 A | * | 1/1999 | Johnson et al. ............. 384/537 |
| 6,129,455 A | * | 10/2000 | Galante ...................... 384/537 |
| 6,238,096 B1 | * | 5/2001 | Allen et al. ................. 384/537 |
| 6,276,838 B1 | * | 8/2001 | Lauk et al. ................. 384/537 |
| 6,279,231 B1 | * | 8/2001 | Beyfuss et al. .......... 29/898.07 |
| 6,379,051 B1 | * | 4/2002 | Horn et al. ................. 384/537 |
| 6,408,519 B1 | * | 6/2002 | Beyfuss et al. |
| 6,505,973 B2 | * | 1/2003 | Buchheim et al. .......... 384/537 |
| 2001/0012418 A1 | * | 8/2001 | Buchheim et al. .......... 384/537 |
| 2001/0022871 A1 | * | 9/2001 | Buchheim et al. .......... 384/537 |

* cited by examiner

BEARING ARRANGEMENT AND METHOD FOR FIXING AT LEAST ONE BEARING IN PLACE IN A BEARING RETAINER

This application is based on and claims priority under 35 U.S.C. §119 with respect to German Application No. P 100 07 437.5 filed on Feb. 18, 2000, the entire content of which is incorporated herein by reference.

FIELD OF THE INVENTION

The invention generally relates to bearing retainers. More particularly, the present invention pertains to a method for fixing at least one bearing in place in a bearing retainer and a bearing receiver for receiving a bearing.

BACKGROUND OF THE INVENTION

German Offenlegungsschrift No. DE 198 05 237 discloses positioning bearings in a bearing retainer and fixing them in place by shaping the material on the front face of the bearing retainer. The shaped material covers a shoulder area arranged around the front face of the outer bearing ring, and in this way constitutes an interlocking connection between the bearing and the bearing retainer.

Although quite good results have been achieved with this arrangement, there exists a need for providing a fixation in place for the bearing in the bearing retainer, which is also capable of withstanding extreme loads.

A need thus exists for fixing the bearing in place in the bearing retainer in such a way that it is able to withstand quite high axial loads over an extended and lasting time period.

SUMMARY OF THE INVENTION

Generally speaking, the present invention involves fixing a bearing in place in a bearing retainer by making use of an interlocking connection, which is achieved by the deformation of the material of the bearing retainer. The interlocking connection made in this way is, however, only stable up to a defined maximum load. If this maximum load is exceeded, a deformation of the material constituting the interlocking connection could occur. Depending on the size and length, or frequency, of the action of the load, damage or even destruction of the interlocked connection could be the result. To ease the potential negative effects of pulse-like load peaks in particular, which occur in case of load changes for example, during the shaping or deformation process, the material of the bearing retainer is not directly pressed against the shoulder of the outer ring, but instead against an elastic element arranged between the shoulder and the material of the retainer. The elastic element cushions the load peaks and therefore inhibits or prevents an undesirably large stress of the interlocking connection and the premature fatigue of the material occurring in connection therewith.

Thus, the present invention has the advantage that the fixation in place of the bearing in the bearing retainer is still reliably assured, even after a multitude of load changes. A further advantage of the present invention is that with the aid of the elastic element, the bearing can be clamped in the axial direction with a predetermined force. Finally, it is also advantageous that manufacturing tolerances are compensated for by the elastic element within defined limits.

According to one aspect of the invention, a method for fixing at least one bearing in place in a bearing retainer having at least one depression for receiving the bearing involves positioning the bearing in the depression, providing an elastic element which acts in the axial direction on the bearing either before or after the at bearing is positioned in the depression so that the elastic element is supported on the bearing in a first axial direction, and deforming a partial area of the bearing retainer so that the deformed partial area of the bearing retainer supports the elastic element in a second axial direction which extends opposite the first axial direction.

According to another aspect of the invention, a method for fixing at least one bearing in place in a bearing retainer having at least one depression for receiving the bearing involves positioning the bearing in the depression, providing an elastic element adjacent a shoulder formed on the bearing either before or after the bearing is positioned in the depression, and deforming a portion of the bearing retainer to displace material of the bearing retainer and form an inwardly directed ridge of the bearing retainer overlying the elastic element so that the elastic element is positioned between the inwardly directed ridge and the shoulder.

According to a further embodiment of the present invention, a bearing arrangement includes a bearing retainer having at least one depression in which is positioned a bearing, with a portion of the bearing retainer overlapping a portion of the bearing to form an interlocking connection between the bearing retainer and the bearing in an axial direction. An elastic element is arranged in an area of the overlap of the bearing and the bearing retainer, and is supported on the bearing in a first axial direction while being supported on the bearing retainer in a second axial direction opposite to the first axial direction.

In accordance with a further aspect of the present invention, a bearing arrangement includes a bearing retainer having at least one depression in which is positioned a bearing, with the bearing including an inner ring, an outer ring and at least one rolling element positioned between the inner and outer rings. The outer ring of the bearing possesses a shoulder, and the bearing retainer possesses a ridge extending inwardly towards the outer ring and positioned in overlapping relation to the shoulder. In addition, an elastic element is positioned between the shoulder and the ridge.

BRIEF DESCRIPTION OF THE DRAWING FIGURES

The foregoing and additional features and characteristics of the present invention will become more apparent from the following detailed description considered with reference to the accompanying drawing figures in which like elements are designated by like reference numerals and wherein.

DETAILED DESCRIPTION OF THE INVENTION

Figure 1:
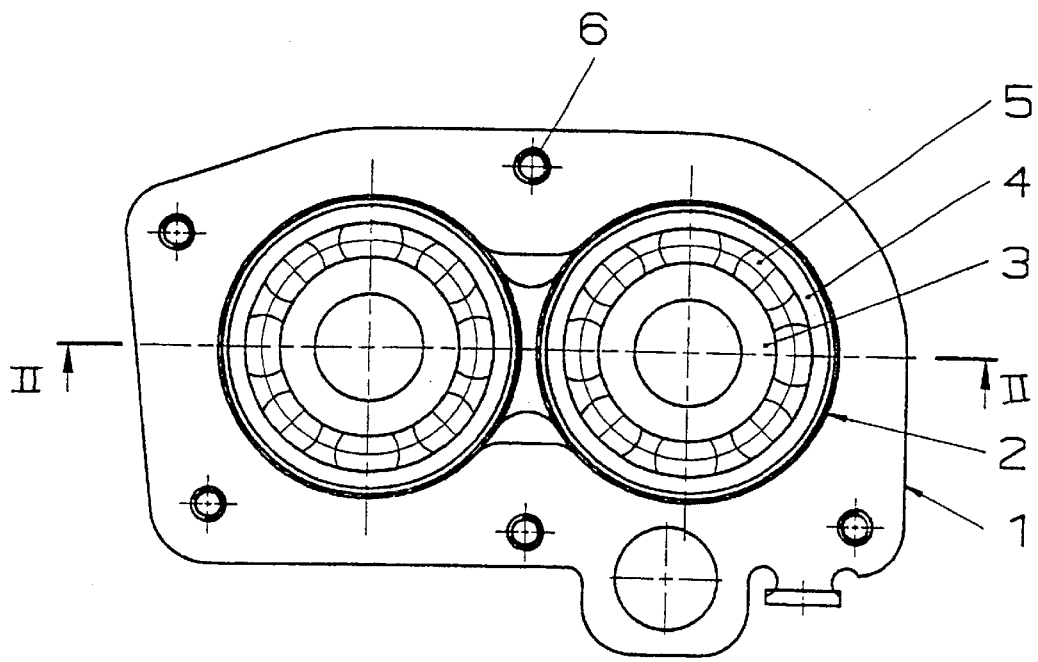
FIG. 1 is a top plan view of the bearing arrangement in accordance with the present invention.

Referring initially to FIG. 1, the bearing arrangement in accordance with the present invention includes two bearings 2 inserted into a bearing retainer 1. Each of the bearings 2 is comprised of an inner ring 3, an outer ring 4 and ball-shaped rolling bodies 5 arranged between the inner ring 3 and the outer ring 4. The bearing retainer 1 is also provided with a number of bores 6 adapted to receive appropriate fasteners for fastening the bearing arrangement in an installation area.

Figure 2:
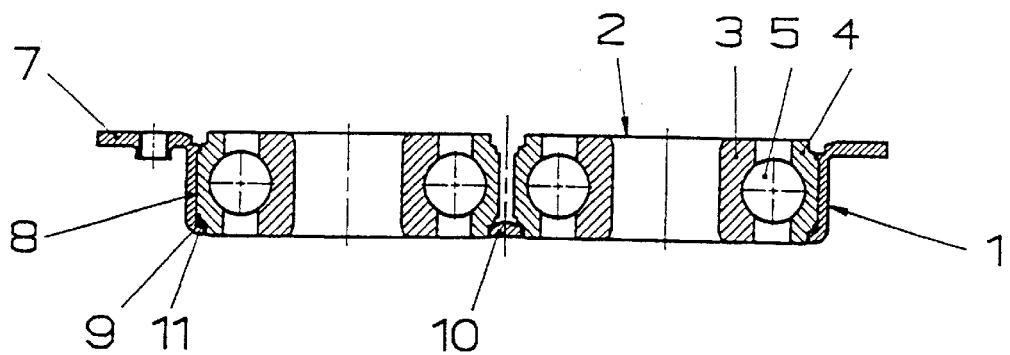
FIG. 2 is a cross-sectional view of the bearing arrangement shown in FIG. 1 taken along the section line II—II in FIG. 1.

As shown in FIG. 2, the bearing retainer 1 is defined by a plate-shaped sheet metal part 7 on which are formed two cylinder-shaped or cylindrically-shaped depressions 8. These depressions extend perpendicular to the plane of the plate. The wall thickness of the surfaces of the cylinder-shaped depressions 8 is reduced to zero in the area between the two bearings 2 so that only a strip 10 arranged on the bottom of the depression 8 remains between the two bearings 2. That is, there is no cylinder-shaped depression in the area between the bearings.

The cylinder-shaped depressions 8 can be produced by means of a deep-drawing process in which, for example, the bottom areas of the cylinder-shaped depressions 8 are each removed by punching out to just a ring-shaped section 9 directly adjoining the surface areas of the cylinder-shaped depressions 8. The ring-shaped sections 9 serve as fastening surfaces for the outer rings 4 of the bearings 2. For this purpose, the outer rings 4 are provided with an annularly extending lower shoulder 11 which rests on the corresponding ring-shaped section 9.

Figure 3:
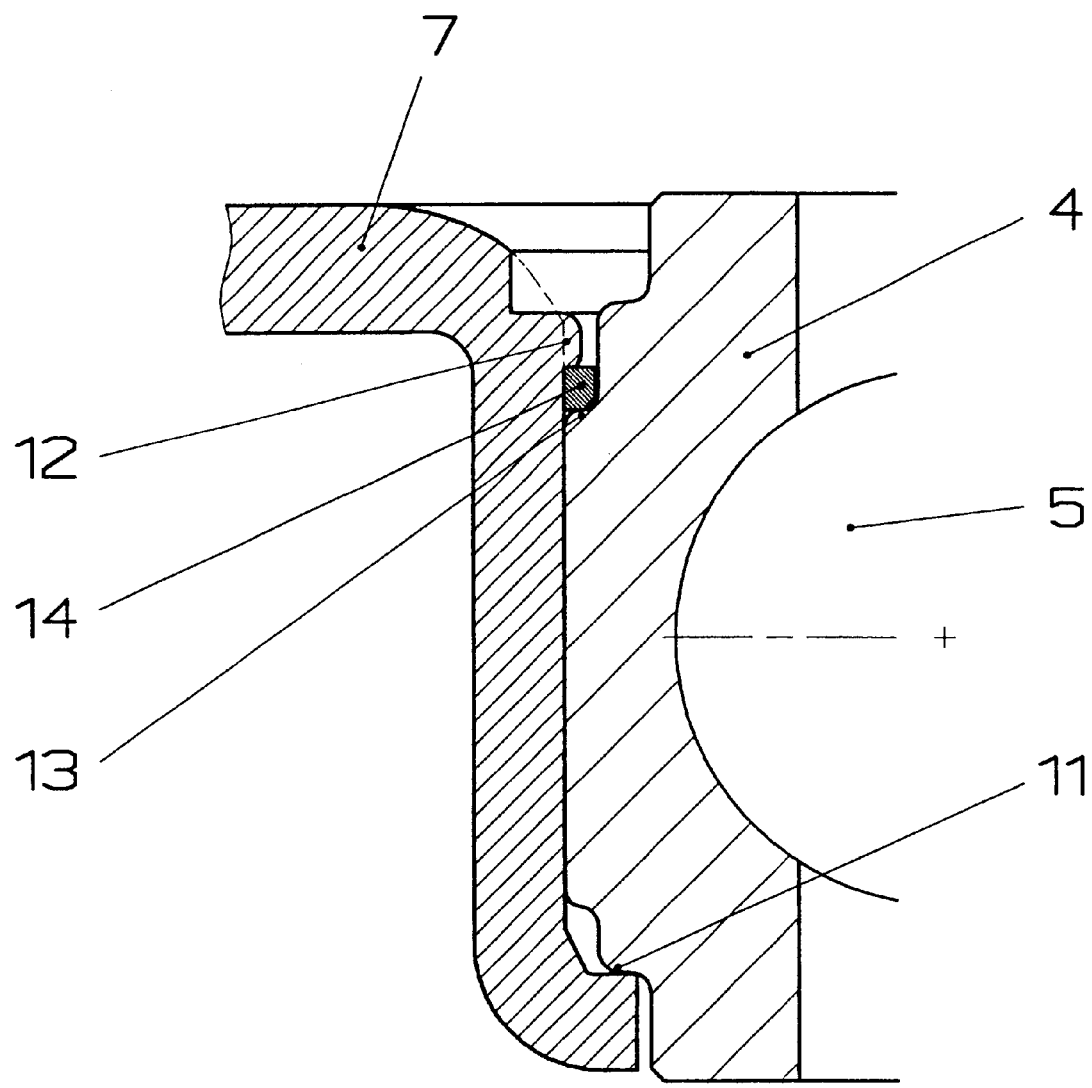
FIG. 3 is an enlarged cross-sectional view of a portion of the bearing arrangement shown in FIG. 2.

Referring to the enlarged detailed cross-sectional view in FIG. 2, during placement of the bearings 2 in the bearing retainer 1, the bearings 2 are inserted into the cylinder-shaped depressions 8 of the bearing retainer 1 until the lower shoulders 11 of the outer rings 4 rest against the ring-shaped sections 9 of the bearing retainer 1. To effect a lasting fixation in place of the bearings 2 in the bearing retainer 1, the bearing retainer 1 is provided with an inwardly directed projection or ridge 12 while the outer rings 4 are provided with an upper shoulder 13 extending around the outer diameter or circumference of the outer rings. The inwardly directed projection 12 of the bearing retainer 1 overlaps or engages the upper shoulder 13 of the outer rings 4 to thus form an interlocking connection as illustrated in FIG. 3.

The inwardly directed projection or ridge 12 is formed by deforming a partial region of the bearing retainer to displace the bearing retainer material. By applying a force to the bearing retainer 1 in the region surrounding the depressions 8 after the bearings 2 are positioned in the depressions 8, the material forming the bearing retainer is displaced inwardly to overlap the upper shoulders 13 of the outer rings 4, thus forming the inwardly directed projections or ridges 12 that interlocking connection with the upper shoulders 13 of the outer rings 4.

In addition, to increase the load-carrying ability and service life of the interlocking connection, an elastic element 14 is positioned on the upper shoulders 13 of the outer rings 4. The elastic element 14 is positioned between the upper shoulder 13 of the outer ring 4 and the displaced material of the bearing retainer forming the inwardly directed projection 12. The elastic element thus acts in the axial direction on the bearing and is supported on the bearing in a first axial direction, while the deformed partial area of the bearing retainer defining the inwardly directed ridge or projection 12 supports the elastic element 14 in a second axial direction extending opposite the first axial direction.

Figure 4:
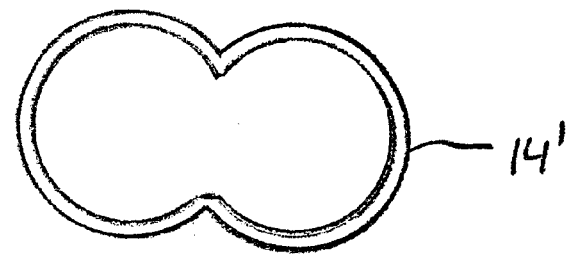
FIG. 4 is a plan view of one embodiment of the elastic element used in the bearing arrangement of the present invention.
Figure 5:
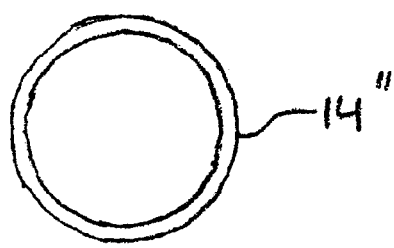
FIG. 5 is a plan view of another embodiment of the elastic element used in the bearing arrangement of the present invention.
Figure 6:
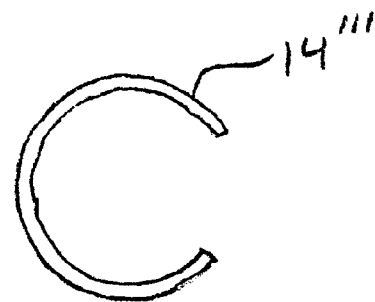
FIG. 6 is a plan view of further embodiment of the elastic element used in the bearing arrangement of the present invention.

A number of different processes can be used to effect the positioning or placement of the elastic elements 14 on the upper shoulders 13. According to one possible method, an elastic element(s) 14 possessing a solid shape is employed. This elastic element(s) can be made, for example, of metal or plastic, in particular of an elastomeric material, and can be embodied in the shape of a plate spring. This elastic element(s) 14 is drawn on the upper shoulder(s) 13 of the outer ring(s) 4 of the bearing(s) 2. Depending on the technical methods available and used, the elastic element(s) 14 can be drawn onto the upper shoulder(s) 13 of the outer ring(s) 4 before or after the bearing(s) 2 has been placed into the bearing retainer 1. A combination tool, which can be additionally used as a pressure ram for effecting deformation of the bearing retainer material in the partial area to produce the interlocking connection, can also be used for drawing the elastic element(s) 14 onto the respective outer ring(s) 4. The shape of the elastic element(s) 14 depends on the number and arrangement of the bearings 2 in the bearing retainer 1. An elastic element 14' having a figure eight shape such as shown in FIG. 4 is suitable in connection with the embodiment represented in FIG. 1. The figure eight shape of the elastic element 14 can be interrupted in the area where the two circles forming the figure eight touch. As an alternative, it is also possible to employ two elastic elements, each of which is ring-shaped so that the rings 14" are configured such as illustrated in FIG. 5. Each of the rings can also be interrupted so that the rings 14''' are configured similar to that shown in FIG. 6.

According to a further variation on the above-described method, it is possible to employ outer rings 4 in which the elastic element 14 is applied to the upper shoulders 13 in a liquid or paste form, with the applied elastic element then being subsequently hardened. It is also possible to vulcanize the elastic element 14 on the upper shoulders 13. The bearings 2, with outer rings 4 pretreated in this way, can then be inserted into the bearing retainer 1, with the above-described interlocking connection being subsequently made.

Moreover, the elastic element 14 in a liquid or paste form can also be applied to the upper shoulders 13 of the outer rings 4 after the bearings 2 have been placed into the bearing retainer 1. With this alternative method, it is possible to omit to a great extent mechanisms that might otherwise be required to prevent the elastic element 14 from flowing off the outer rings 4. That is, by placing the bearings 2 in the bearing retainer 1 and then applying the elastic element 14, the material is inhibited or substantially prevented from flowing off the upper shoulders 13 by virtue of the outer rings 4 and the bearing retainer 1. Depending on the material used for the elastic element and the desired effect, the interlocking connection is already made before, or only after the hardening of the elastic element 14.

When the partial area of the bearing retainer material is deformed or displaced to produce the inwardly directed shoulder or ridge 12, it is preferable that the partial area of the bearing retainer is pressed by the deformation with sufficient strength against the elastic element that predetermined prestress in the elastic element 14 results.

With the above described various methods in accordance with the present invention, the elastic element 14 is applied to the upper shoulders 13 of the outer rings 4 before the interlocking connection is made by shaping the bearing retainer 1 (i.e., by displacing a portion of the material of the retainer 1 to form the projection 12). However, it is also possible to reverse this sequence. With this alternative approach, the elastic element 14 must be of such a form that the material forming the elastic element 14 can be inserted into the space between the upper shoulders 13 of the outer rings 4 and the displaced material 12 of the bearing retainer 1. Thus, with this alternative embodiment, elastic elements 14 are preferably used which are available in liquid form and which harden after being placed into the space. It is also possible with this alternative to set an axial prestress if the material used for the elastic element 14 undergoes an increase in volume following hardening. As described above, the bearing retainers 1 is designed to accommodate two bearings 2. However, it is to be understood that the present invention is not limited in this regard and also has application to bearing retainers adapted to accommodate other numbers of bearings.

Also, in place of the roller bearings described above, the bearing retainer 1 in accordance with the present invention can be used in conjunction with other rolling bearings, such as cylinder rolling bearings or tapered rolling bearings, and also sliding bearings.

The principles and preferred embodiments of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A bearing arrangement comprising a single piece bearing retainer having at least one depression in which is positioned a bearing, the bearing comprising an inner ring, an outer ring and at least one rolling element positioned between the inner and outer rings, a portion of the single piece bearing retainer at each end of the bearing retainer extending radially inwardly farther than an outer periphery of the outer ring so that the portion of the single piece bearing retainer at each end overlaps a portion of the outer ring adjacent each end of the bearing to form an interlocking connection between the bearing retainer and the bearing, and an elastic element arranged in an area of the overlap of the bearing and the bearing retainer, and supported by the bearing in a first axial direction while being supported by the bearing retainer in a second axial direction opposite to the first axial direction.

2. The bearing arrangement in accordance with claim 1, wherein the at least one bearing has a shoulder extending around its exterior diameter that receives the elastic element.

3. The bearing arrangement in accordance with claim 1, wherein the elastic element is ring-shaped.

4. The bearing arrangement in accordance with claim 1, wherein the elastic element possesses a substantially figure eight shape.

5. The bearing arrangement in accordance with claim 1, wherein the elastic element is made of metal or plastic.

6. A bearing arrangement comprising a single piece bearing retainer having at least one depression in which is positioned a bearing, the bearing including an inner ring, an outer ring and at least one rolling element positioned between the inner and outer rings, the outer ring including a shoulder, the single piece bearing retainer including a ridge extending inwardly towards the outer ring and positioned in overlapping relation to the shoulder, and an elastic element positioned between the shoulder and the ridge, the elastic element being supported in a first axial direction by the shoulder of the bearing and in a second axial direction by the ridge of the retainer.

7. The bearing arrangement in accordance with claim 6, wherein the elastic element is ring-shaped.

8. The bearing arrangement in accordance with claim 6, wherein the elastic element possesses a substantially figure eight shape.

9. The bearing arrangement in accordance with claim 6, wherein the elastic element is made of metal or plastic.

* * * * *